Aug. 16, 1966 G. F. MORRIS ETAL 3,267,456
APPARATUS FOR CONVERSION FROM MORSE CODE TO VISUAL DISPLAY
Filed Oct. 16, 1961
4 Sheets-Sheet 1

INVENTORS.
GEORGE F. MORRIS
WATSON F. WALKER
BY
T. L. Styner
ATTORNEY

Aug. 16, 1966 G. F. MORRIS ETAL 3,267,456

APPARATUS FOR CONVERSION FROM MORSE CODE TO VISUAL DISPLAY

Filed Oct. 16, 1961 4 Sheets-Sheet 2

ELEMENT POSITION

| | 1 | 2 | 3 | 4 |
|---|---|---|---|---|
| DOT | 1 | 2 | 4 | 8 |
| DASH | 2 | 4 | 8 | 16 |

MORSE CODE ELEMENT WEIGHTS

Fig. 4

| LETTER | MORSE CODE | ANALOG WEIGHT | LETTER | MORSE CODE | ANALOG WEIGHT |
|---|---|---|---|---|---|
| E | • | 1 | H | • • • • | 15 |
| T | — | 2 | B | — • • • | 16 |
| I | • • | 3 | F | • — • • | 17 |
| N | — • | 4 | Z | — — • • | 18 |
| A | • — | 5 | L | • • — • | 19 |
| M | — — | 6 | C | — • — • | 20 |
| S | • • • | 7 | P | • — — • | 21 |
| D | — • • | 8 | J | — — — • | 22 |
| R | • — • | 9 | V | • • • — | 23 |
| G | — — • | 10 | X | — • • — | 24 |
| U | • • — | 11 | NOT USED | • — • — | 25 |
| K | — • — | 12 | Q | — — • — | 26 |
| W | • — — | 13 | NOT USED | • • — — | 27 |
| O | — — — | 14 | Y | — • — — | 28 |

Fig. 5

3,267,456

APPARATUS FOR CONVERSION FROM MORSE CODE TO VISUAL DISPLAY

George F. Morris, Rochester, and Watson F. Walker, Pittsford, N.Y., assignors to General Dynamics Corporation, Rochester, N.Y., a corporation of Delaware Filed Oct. 16, 1961, Ser. No. 145,117
8 Claims. (Cl. 340—325)

This invention relates to equipment and to methods for reading out or visually displaying meaningful indicia, such as letters or numbers, received as Morse-type coded groups of dot and dash signal elements.

The art of binary coded signals for transmission of messages and for reading out or printing such messages is highly developed. However, there has heretofore been devised satisfactory equipment for reading out dot-dash signals. That equipment which has been employed early in the telegraphic art for printing out dot and dash signals generally relied upon relay circuits of different time constants for distinguishing between the code elements of different lengths and was characterized by cumbersome heavy mechanisms. There is no known equipment suitable for airborne uses where reliability, lightweight, and simplicity are the criteria. In navigating systems, such as TACAN, where the navigator can identify the beacon from which navigating information is obtained only by listening for the characteristic dot and dash tone signals, there is chance of misinterpretation of such audible signals. It would be desirable, indeed, to visually present the call signals of the beacon to the pilot upon a small display box mounted in the dashboard of the cockpit.

An object of this invention is to provide improved methods and equipment for decoding and visually displaying dot-dash type messages.

A more specific object of this invention is to provide improved decoding and display equipment for dot-dash messages which equipment is reliable in operation, light in weight, and simple in construction.

The objects of this invention are attained by receiving the dot and dash signals and by assigning distinct analog weights to the dot and dash signal elements depending first upon their position in the group of dots and dashes for each code letter and second upon the duration of each dot and dash. The weight of each of the code elements of the group are then added and, in the form of a series of pulses, are applied to a step-by-step driving motor for rotating, for example, a drum upon the periphery of which is printed decimal numbers or the letters of the alphabet. That is, by assigning weight to the coded elements, each of the letters in the alphabet can be ordered and displayed according to the sum of the weight of their elements. If desired, a second and a third drum, each with a complete alphabet, may be mounted side-by-side for displaying all the call letters of a transmitting station.

Other features and objects of this invention will become apparent to those skilled in this art by referring to the specific embodiments described in the following specification and shown in the accompanying drawings in which:

FIG. 4 shows a tabulation of representative weights of dots and dashes for each element position;

FIG. 5 shows a table with the letters of the alphabet arranged in ascending order of their weights, according to the weights assigned in the table of FIG. 4;

Figure 1:
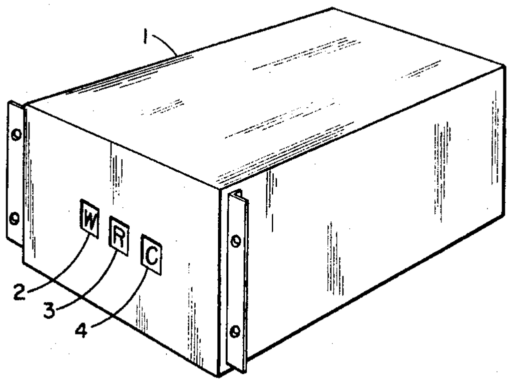
FIG. 1 shows in perspective the type of display box contemplated by this invention.
Figure 2:
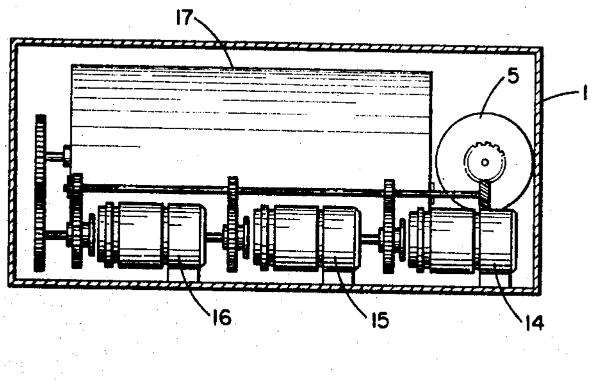
FIGS. 2 and 3 are, respectively, side and front views of the display equipment of FIG. 1 with side and end panels of the cover box removed.
Figure 3:
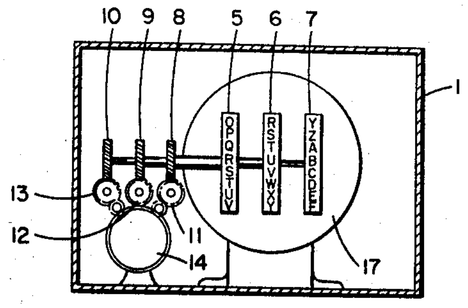

The display box 1 of FIG. 1 shows, by way of example, three windows 2, 3 and 4 in one side of the box in each of which any one of the letters of the alphabet or other characters or indicia might be displayed, in accordance with message information received. Behind windows 2, 3 and 4 are mounted, respectively, carriers for the characters such as drums 5, 6 and 7, FIG. 3, each with a complete alphabet printed on the periphery thereof and each rotatable to selectively bring each letter into registry with the windows. Drums 5, 6 and 7 are driven, respectively, by pinions 8, 9 and 10. The three connecting shafts are, conveniently, of different diameters and are telescoped to coaxially support the pinions and their drums. Each pinion is driven by gears 11, 12 and 13, respectively, which are, in turn, coupled through magnetic clutches 14, 15 and 16 to motor 17. Motor 17 is of the step-by-step type, such as a controllable two-phase motor. Through the gear train shown, the motor will drive step-by-step one of the drums 5, 6 or 7 depending on whether clutch 14, 15 or 16 is energized and engaged. Energization of the motor and of the clutches to display three successively received Morse coded letters will be described in connection with FIG. 6.

As stated, a dot-dash code-to-analog scale conversion system is used which is based on the assignment of distinct analog weights to the code elements depending upon their position in the letter code and upon their duration. The "weight" of a dot or dash is evidenced, in the particular embodiment disclosed here, by different numbers of electrical pulses which are employed to drive the display mechanisms. One system of weights according to position and duration is shown in the table of FIG. 4. While the particular weights shown in FIG. 4 are exponentially related and are conveniently employed in the system of FIG. 6, it will become apparent that other weights may be arbitrarily assigned. By assigning the weights of FIG. 4, each of the letters in the alphabet can be ordered according to the sum of the weights of their elements as shown in FIG. 5, where the letters of the alphabet are arranged in ascending order of their weights along with the accepted groupings of dots and dashes of the Morse code. If the Continental or the International code was employed instead of the Morse code, there would be, of course, some rearrangements of the letters. Using a representation of the Morse code and alphabet of FIG. 5, a simple addition of the analog weights will effectively complete the decoding process. In the proposed decoder, the letters are printed on the periphery of the drums 5, 6 and 7 in the order indicated in FIG. 5. According to this invention the drum is then rotated during the decoding process by an amount proportional to the analog weight of the incoming code; and where the weights comprise electrical pulses, the drum is rotated step-by-step. In this way, the appropriate letter is brought in line with the viewing windows 2, 3 and 4 immediately upon the completion of the decoding process of each group of dot and dash code elements. As soon as the last code element of the last letter has been received, the entire visual display will be complete. No electrical storage of received information is required.

The dot-dash decoding process described here is based upon the following identity code timing specifications for ground-based TACAN beacons:

| Code element: | Duration |
|---|---|
| Dot | 0.125 second ±10% |
| Dash | 0.375 second ±10% |
| Space between dot and dash | 0.125 second ±10% |
| Space between letters | 0.375 second ±10% |

Other dot and dash durations and other timing intervals between dots and dashes and between letters may, of course, be employed.

Figure 7:
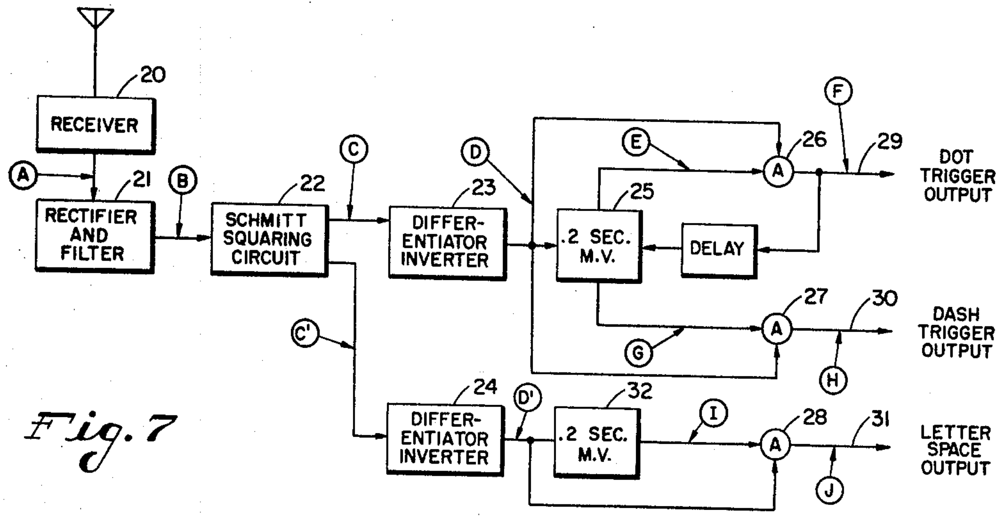
FIG. 7 shows one decoding circuit suitable for the system shown in FIG. 6.
Figure 8:
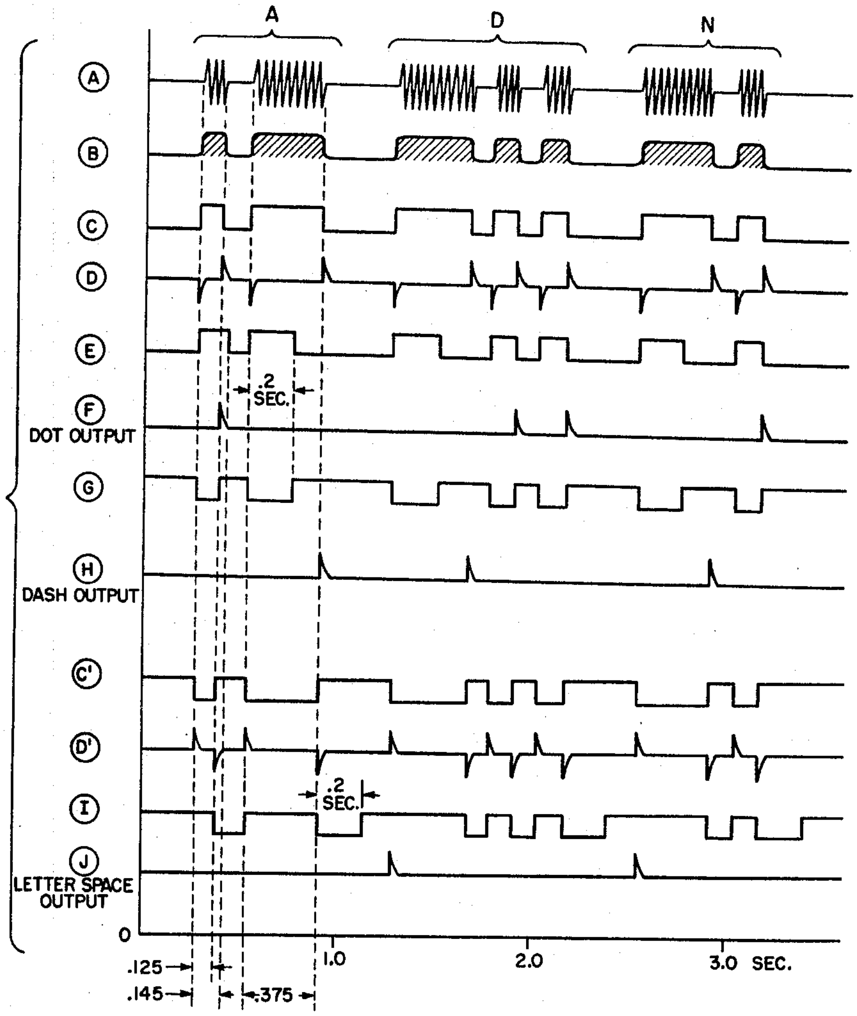
FIG. 8 shows a family of curves representative of typical voltages found in the circuits of FIG. 7.

A detailed description of the dot-dash decoding process and equipment is now given in connection with FIG. 7. It is contemplated that the received code signals may arrive via radio or wire line, with or without a carrier. The tone frequency of the detected dots and dashes is typically the easily audible 1350 cycles per second, represented on line A of FIG. 8. After detection in the receiver 20, the tone signals are applied to the rectifier 21 to produce the signal at the output of the rectifier shown on line B of FIG. 8. Because of the irregularities in the wave shapes of the rectified wave, it is preferred that the signals be squared as in a multivibrator such as a Schmitt squaring circuit 22. It is preferred further that both the squared wave as received and its complement shown, respectively, on output lines C and C′ be derived. The squared waves are then differentiated in differentiators 23 and 24 to provide the sharp voltage spikes at the leading and trailing edges of the square wave as shown on lines D and D′ in FIG. 8. The negative-going spikes D are used to trigger the monostable multivibrator 25. The multivibrator 25 will remain in its unstable state for a measured length of time depending upon the dot and dash durations. Where these duration specifications are of the values indicated above, it is found that the duration of the unstable state of the multivibrator may conveniently be chosen at about 0.2 second, which is a time period intermediate the durations of the dot and the dash signal elements. The primary output E of the multivibrator is applied to the coincidence gate 26 together with the differentiated waveform D at the input of the multivibrator. If a positive-going pulse D, representing the trailing edge of an incoming code element, appears at the gate during the 0.2 second period, the pulse will pass through the gate as a decoded dot; see line F in FIG. 8. After a delay of approximately .02 second after receipt of the positive-going pulse D, the 0.2 second multivibrator is then reset to be ready for the next incoming code element. If, however, the positive-going pulse in the D waveform does not occur until after the 0.2 second interval, it is blocked at the dot gate 26 and instead passes through the dash gate 27. The latter signal passes through the dash gate where the complement, G, of the 0.2 second multivibrator output is applied as a gating waveform. Hence, signals of the duration of a dash produce a pulse H on line 30.

It will be noted that the interval following a group of dot-dash elements of a letter is greater than the interval between dot-dash elements. This interval can be recognized by the circuits of FIG. 7. The recognition and decoding of the letter-space is performed in a manner similar to that of dash decoding. In the case of letter-space decoding, however, the complement of the Schmitt waveform is used. For this purpose, the complement waveform C′ is differentiated in differentiator 24 to produce spikes D′ which is applied to coincidence gate 28 along with the output I of the multivibrator 32. Although conventional coincidence gates responsive to two positive voltages are shown here, gates responsive to two negative voltages could be employed. Accordingly, received dots appear as spikes F on line 29, dashes appear as spikes H on line 30, and letter-spaces appear as spikes J on line 31.

To translate the dot-dash and letter-space information of lines 29, 30 and 31, respectively, to drum rotation of the visual indicator, reference will now be made to FIG. 6. Motor 17 is, as stated, of the step-by-step type and is selectively connected to drums 5, 6 and 7 through the gear linkage represented in FIG. 6 by the dotted line 32. In each drum linkage is a magnetic clutch, the clutch 14 comprising two iron clutch plates 14a which are engaged when coil 14b is energized. Clutch plates 15a and winding 15b likewise control drum 6, while clutch plates 16a and winding 16b control drum 7.

The scale-of-3 counter 40 is driven by the letter-space decoder and is a circuit which, at the start of a message, will have a direct current voltage on terminal 41 and no voltage on terminals 42 or 43. After receiving one input trigger from the letter-space decoder, the direct current voltage will appear at terminal 42, no output appearing at terminals 41 or 43. The second input trigger from the letter-space decoder will move the output voltage from terminal 42 to terminal 43. A trigger pulse on the counter reset line 44 will move the scale-of-3 counter output back to terminal 41, preparatory for the beginning of a message. Reference will again be made below to the counter reset circuit.

The scale-of-4 counter 50 is the same as the scale-of-3 counter 40 except that the four output terminals 51, 52, 53 and 54 are available and are successively and individually energized. Each decoded dot and dash at terminals 29 or 30 will pass through OR gate 60 and delay circuit 61 and cause the scale-of-4 counter to operate and move the D.C. voltage from one output terminal to the next. The reset pulse on line 44 at the completion of each code element group serves to reestablish the voltage on output line 51 preparatory for the beginning of a new code element group.

The single pulse generator 70, the 2-pulse generator 71 the 4-pulse generator 72, the 8-pulse generator 73, and the 16-pulse generator 74 are each circuits which will deliver one, two, four, eight and sixteen pulses, respectively, when stimulated by a single input trigger pulse. These multipulse generators may be ring counters or other shift register type circuits which will deliver a built-in number of pulses immediately after pulse stimulation. Each may consist, for example, of a free-running L-C oscillator which is gated on by a one-shot multivibrator, not shown, which is turned on by the dot or dash pulses F or H of FIG. 8. The width of the multivibrator pulse is adjusted to allow as many cycles of oscillations as desired, say, one, two, four, eight or sixteen. If desired, the single pulse generator 70 may be a simple one-shot multivibrator.

A decoded dot signal at terminal 29 is selectively routed to generators 70, 71, 72 or 73 through AND gates 80, 81, 82 or 83, depending upon the position of the dot within the code element group which position is known to the scale-of-4 counter 50. Likewise, a dash signal appearing at terminal 30 at the output of the dash decoder is selectively routed to generators 71, 72, 73 or 74 through one of the AND gates 90, 91, 92 and 93, depending upon the position of the received dash signal within the group of code elements. The position of the dash element within the group is determined by the scale-of 4 counter whose four output terminals are connected to the control circuits, respectively, of the AND gates 90–93.

Figure 6:
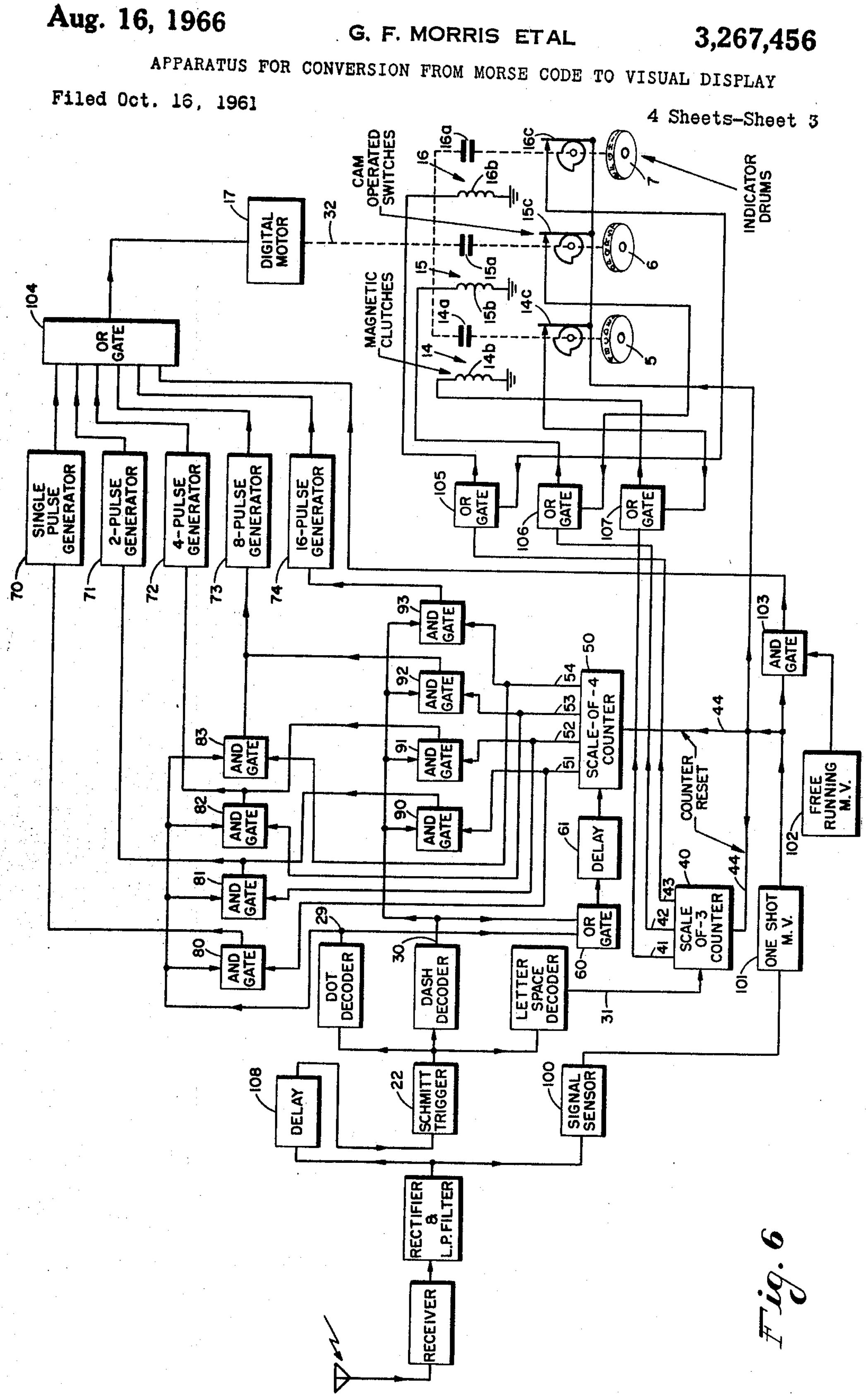
FIG. 6 is a schematic block diagram of one complete decoding and display system of this invention.

The operation of the electronic visual display system of FIG. 6 can best be explained by first assuming that the entire system has been reset to zero and then following the operation of the various circuits as they decode dots and dashes. If the first element to be decoded is a dot, a trigger from the dot decoder at terminal 29 will be fed to each of the upper group of AND gates 80–83. Since the scale-of-4 counter 50 has an output at its terminal 51, the first AND gate 80 will deliver an output to the single pulse generator 70, the other AND gates 81, 82 and 83 remain inactive. The pulse generator 70 will then deliver a single pulse to the digital motor 17 causing its shaft to rotate one step. Since the scale-of-3 counter 40 has an output on its terminal 41, only the magnetic clutch coil 14b will be energized and the clutch plates 14a will be engaged and the drum 5 will rotate one step. If, however, the first code element of the group of code elements had been a dash, a pulse would have appeared on line 30 and would have passed through gate 90 which would have been enabled by the voltage standing at the output 51 of the counter 50. From gate 90 the dash pulse would move directly to the 2-pulse generator 71 and would have advanced the digital motor 17 two steps. In either case, after a delay, by delay circuit 61, sufficient to allow the digital motor 17 to position the letter drum, the scale-of-4 counter 50 will receive a dot or dash trigger pulse through OR gate 60 shifting the counter output from terminal 51 to terminal 52. Then, a decoded dot as a second element will trigger the 2-pulse generator 71 through AND gate 81, or a decoded dash will trigger the 4-pulse generator 72 through AND gate 91, moving the first letter drum either two or four steps, in accordance with the scale-of-weights shown in FIG. 4.

When a letter-space is decoded and appears at terminal 31, the scale-of-3 counter 40 output will move from its terminal 41 to terminal 42 thereby disabling the first clutch 14 and coupling the second letter drum 6 through its magnetic clutch 15 to the digital motor. Dots and dashes will then be decoded as before, but will now step the second drum a distance corresponding to the total of the analog weights of the second group of dots and dashes. The code element group for the third letter is received and indicated on drum 7, as with the previous letters. A fourth and additional drums could be added, in an obvious manner.

When the entire message has been decoded, a process which will take about four seconds in one embodiment, the visual display will remain at rest until a new message is received. At this time, the signal sensor 100 will detect the beginning of the Morse code transmission and will deliver a triggering pulse to the one-shot multivibrator 101. Leads 44 connected to the output of multivibrator 101 will reset the two counters 40 and 50 and will gate on the free-running multivibrator 102. Preferably, the output of the free-running multivibrator 102 is switched on and off by the AND gate 103. The digital motor will then be driven by the free-running multivibrator through the AND gate 103 and the OR gate 104. At the same time the counter reset 44 has energized all three magnetic clutches through the cam-operated switches 14c, 15c and 16c and OR gates 105, 106 and 107. The motor then will rotate each of the three letter drums until the cam-operated switches 14c, 15c and 16c associated with each drum interrupts the clutch coil circuits. The cams are rotationally oriented so that the clutch circuit interruption always stops the drum in the starting position. The free-running multivibrator 102 will have an "on" period long enough to allow the digital motor to drive the letter drums through one complete rotation, should it be necessary to drive the drums one complete revolution for resetting. The delay period of delay circuit 108, preceding the Schmitt trigger circuit 22, will be long enough to permit the entire unit to be reset before the decoding process begins.

The logic circuits of FIG. 6 may be fabricated with solid state diodes and transistors and may be made in small, lightweight sizes which are reliable in operation and have long life.

What is claimed is:

1. A display system for character information contained in groups of dot and dash signal elements, the dot signal elements and the dash signal elements comprising, respectively, voltage pulses of relatively short and relatively long durations, the system comprising in combination:

(a) means for decoding said signal elements and producing signals selectively on one of a first and a second line according to signal element duration, (b) display means having characters in aligned one-dimensional array for forward step-by-step movement for successive display of each character, (c) a single step-by-step motor for driving said display means to successively display each of all of the information characters, (d) a plurality of pulse generators adapted to produce different numbers of pulses in response to a single stimulating signal from either of said first and second lines for pulsing and stepping said motor and display means, and (e) logical circuit means for connecting said first and second lines, respectively, to one pair of said generators during decoding of a first signal element so that the amplitude of movement of said display means is one function of signal element duration, and for connecting said first and second lines to a different pair of said generators during decoding of the next signal element so that the amplitude of movement of said display means becomes a different function of signal element duration.

2. A visual readout system for groups of dot-dash coded signals having signal elements of two distinct lengths and predetermined spacings, the system comprising:

(a) means for distinctly marking the beginning and end of each signal element with a relatively sharp pulse, (b) pulse decoding means for measuring the spacings between said pulses and for producing a signal selectively on either of two leads according to the length of each signal element, (c) readout mechanism comprising an indicia carrying medium and means for moving said medium to selectively display elemental indicia on said medium, and (d) means for moving said medium a first predetermined number of steps in response to a signal on one of said leads and means for moving said medium a second and different predetermined number of steps in response to a signal on the other of said leads.

3. A display system for dot and dash signal elements comprising:

(a) decoding means for isolating on first and second circuits signals which are, respectively, of dot duration and of dash duration, (b) a character carrier, a one-dimensional array of aligned characters arranged to be successively brought into display position as said carrier is moved step-by-step, (c) a step-by-step motor coupled to and driving said carrier, (d) a plurality of pulse generators, said generators each being responsive to a single stimulus and producing a series of different predetermined numbers of output pulses, (e) means for coupling said first and second circuits to the control circuits of different generators, and (f) means for coupling the output of each of said generators to said motor for driving said motor step-by-step so that said carrier is advanced step-by-step, the numbers of steps corresponding to the total numbers of pulses delivered by the particular generator stimulated.

4. The display system defined in claim 3 further comprising:

(a) means responsive to a signal in either of said first circuit or said second circuit for shifting said first and second circuits from one pair of generators to a second pair of generators so that succeeding dot-dash signals receive successively different carrier stepping weights.

5. A decoding and display system for information contained in coded dot and dash signal elements, the dot and dash signal elements having short and long durations, respectively, and having one characteristic no-signal interval between signal elements and having another characteristic no-signal interval between groups of signal elements, said system comprising:

(a) a step-by-step digital motor means,
(b) a plurality of drums,
(c) clutch means between each drum and said motor means,
(d) a series of pulse generators, each generator being adapted to generate a distinctive number of pulses in response to a single stimulating pulse, the output of each generator being connected to said motor,
(e) decoding means for producing a signal voltage on a first line in response to a dot signal and for producing a signal voltage on a second line in response to a dash signal, and a signal voltage on a third line in response to a no-signal interval of characteristic duration following a letter group of signal elements,
(f) a first stepping counter with a plurality of output lines and means for producing successively voltages on said output lines in response to successive input signals,
(g) a first series of AND gates, said AND gates being coupled, respectively, to said output lines of said first stepping counter for successively coupling a plurality of said pulse generators to the dot circuit, and
(h) a second series of AND gates connected, respectively, to said stepping counter output circuits for successively coupling a plurality of said pulse generators to the dash circuit for driving said motor means and a coupled drum a measured number of steps depending upon the code arrangement of said dot and dash signal elements.

6. The system of claim 5 further comprising:

(a) a second stepping counter responsive to said third line for successively engaging said plurality of clutches, said second counter being responsive to said voltage signals on said third line.

7. The decoding and display system of claim 5 further comprising:

(a) a free-running pulse generator,
(b) switch means for coupling said free-running generator to said step-by-step digital motor, said switch means being responsive to the initial dot or dash signal of a group of signal elements for operating said gate to drive all said plurality of drums to their initial starting positions.

8. A decoding and display system for information contained in coded groups of dot and dash signal elements, said system comprising:

(a) a plurality of carriers, each carrier having a single series of aligned characters suitable for readout and being adapted to be successively brought into display posiiton,
(b) a step-by-step digital motor,
(c) a plurality of clutch means coupled, respectively, between said carriers and said motor,
(d) a plurality of pulse generators adapted to produce different numbers of pulses in response to a stimulating signal for pulsing said step-by-step digital motor, the numbers of pulses produced by the generators being exponentially-related,
(e) decoding means for isolating dot signals and dash signals, respectively, on first and second lines,
(f) logical AND gate circuit means for coupling said first and second lines to said generators for weighting the numbers of pulses delivered to said motor in accordance with the position of and numbers of dot and dash signals in each group of signal elements.

References Cited by the Examiner

UNITED STATES PATENTS

| | | | |
|---|---|---|---|
| 2,399,956 | 5/1946 | Thomson | 340—167 |
| 2,678,965 | 5/1954 | Ziffer et al. | 340—347 |
| 2,847,161 | 8/1958 | Greenfield | 340—147 |
| 2,870,429 | 1/1959 | Hales | 340—167 |
| 2,934,745 | 4/1960 | Kocmanek | 340—147 |
| 3,038,030 | 6/1962 | Murray | 178—26.5 |

NEIL C. READ, *Primary Examiner.*

ROBERT H. ROSE, *Examiner.*

H. I. PITTS, *Assistant Examiner.*